(12) United States Patent
Vdoviak, Jr. et al.

(10) Patent No.: US 11,066,955 B2
(45) Date of Patent: Jul. 20, 2021

(54) FLUID-COOLED SEAL ARRANGEMENT FOR A GAS TURBINE ENGINE

(71) Applicant: United Technologies Corporation, Farmington, CT (US)

(72) Inventors: Garth J. Vdoviak, Jr., Readfield, ME (US); Gary L. Grogg, South Berwick, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 20 days.

(21) Appl. No.: 16/127,524

(22) Filed: Sep. 11, 2018

(65) Prior Publication Data
US 2019/0017414 A1 Jan. 17, 2019

Related U.S. Application Data

(62) Division of application No. 14/771,867, filed as application No. PCT/US2014/021881 on Mar. 7, 2014, now Pat. No. 10,100,672.

(60) Provisional application No. 61/775,218, filed on Mar. 8, 2013.

(51) Int. Cl.
| F01D 25/18 | (2006.01) |
| F16J 15/16 | (2006.01) |
| F01D 25/12 | (2006.01) |
| F02C 7/28 | (2006.01) |
| F04D 29/059 | (2006.01) |
| F04D 29/063 | (2006.01) |
| F04D 29/12 | (2006.01) |
| F04D 29/32 | (2006.01) |
| F02C 7/06 | (2006.01) |

(Continued)

(52) U.S. Cl.
CPC ........... *F01D 25/183* (2013.01); *F01D 25/12* (2013.01); *F02C 7/28* (2013.01); *F16J 15/162* (2013.01); *F02C 7/06* (2013.01); *F04D 29/059* (2013.01); *F04D 29/063* (2013.01); *F04D 29/124* (2013.01); *F04D 29/321* (2013.01); *F05D 2220/32* (2013.01); *F05D 2240/50* (2013.01); *F05D 2240/55* (2013.01); *F05D 2260/20* (2013.01); *F16C 19/26* (2013.01); *F16C 33/6677* (2013.01); *F16C 2360/23* (2013.01)

(58) Field of Classification Search
CPC ........ F01D 25/12; F01D 25/14; F01D 25/183; F01D 11/003; F05D 2240/55; F16J 15/162; Y10S 277/92; F02C 7/28
See application file for complete search history.

(56) References Cited

U.S. PATENT DOCUMENTS

| 2,956,824 A | 10/1960 | Kuchler et al. |
| 4,406,460 A | 9/1983 | Slayton |
| 4,969,652 A | 11/1990 | Munson |

(Continued)

FOREIGN PATENT DOCUMENTS

EP 0818607 A2 1/1998

OTHER PUBLICATIONS

European Extended Search Report dated Oct. 12, 2016, issued in the corresponding European Patent Application No. 14761152.9.

*Primary Examiner* — Nicholas L Foster
(74) *Attorney, Agent, or Firm* — Bachman & LaPointe, P.C.

(57) ABSTRACT

A component for a gas turbine engine includes a compartment housing that redirects oil from at least one passage in a rotational component onto a backside of a seal land.

11 Claims, 6 Drawing Sheets

(51) Int. Cl.
*F16C 33/66* (2006.01)
*F16C 19/26* (2006.01)

(56) References Cited

U.S. PATENT DOCUMENTS

| | | | |
|---|---|---|---|
| 4,979,755 A * | 12/1990 | Lebreton | F01D 11/02 |
| | | | 277/303 |
| 5,301,957 A | 4/1994 | Hwang et al. | |
| 5,593,165 A | 1/1997 | Murray et al. | |
| 5,707,064 A * | 1/1998 | Vance | F16F 9/36 |
| | | | 415/174.5 |
| 5,794,942 A * | 8/1998 | Vance | F01D 25/04 |
| | | | 277/303 |
| 7,344,139 B2 | 3/2008 | Saebler et al. | |
| 8,678,741 B2 | 3/2014 | Olennikov | |
| 8,905,408 B2 | 12/2014 | Garrison | |
| 9,115,592 B2 | 8/2015 | Gauthier et al. | |
| 9,631,508 B2 | 4/2017 | Blais et al. | |
| 9,752,616 B2 | 9/2017 | Saadi et al. | |
| 9,810,095 B2 | 11/2017 | Morreale et al. | |
| 10,364,846 B2 * | 7/2019 | Clark | F16C 37/00 |
| 10,443,732 B2 * | 10/2019 | Clark | F02C 7/06 |
| 2005/0230922 A1 | 10/2005 | Maguire | |
| 2006/0033289 A1 | 2/2006 | Gaebler et al. | |
| 2008/0080969 A1 | 4/2008 | Legare et al. | |
| 2011/0223003 A1 | 9/2011 | Olennikov | |
| 2013/0015018 A1 | 1/2013 | Gauthier et al. | |
| 2013/0241153 A1 | 9/2013 | Garrison | |
| 2014/0119887 A1 | 5/2014 | Lyle et al. | |
| 2015/0069712 A1 | 3/2015 | Garrison | |
| 2016/0238135 A1 | 8/2016 | Clark et al. | |
| 2016/0238137 A1 * | 8/2016 | Clark | F16C 37/00 |
| 2016/0281779 A1 | 9/2016 | Saadi et al. | |
| 2016/0305283 A1 | 10/2016 | Morreale et al. | |
| 2016/0348522 A1 | 12/2016 | Labbe | |
| 2016/0348792 A1 | 12/2016 | Labbe | |
| 2017/0016350 A1 * | 1/2017 | Miller | F01D 25/183 |
| 2017/0328405 A1 | 11/2017 | Saadi et al. | |
| 2020/0011422 A1 * | 1/2020 | Clark | F16J 15/168 |

\* cited by examiner

FLUID-COOLED SEAL ARRANGEMENT FOR A GAS TURBINE ENGINE

CROSS-REFERENCE TO RELATED APPLICATIONS

The instant application is a divisional application of U.S. patent application Ser. No. 14/771,867 filed Sep. 1, 2015, which is a 371 of International Application No. PCT/US2014/021881 filed Mar. 7, 2014, which claims benefit of U.S. Patent Application Ser. No. 61/775,218 filed Mar. 8, 2013.

BACKGROUND

The present disclosure relates to a gas turbine engine and, more particularly, to fluid-cooled seal arrangements therefor.

Certain sections of gas turbine engines may operate at high temperatures and pressures and some engine components may be sensitive thereto. Typically, seal systems are positioned to prevent the high temperature and pressure air from flowing into sensitive areas and prevent the oil used for cooling and lubrication from escaping the compartment. One such seal system includes carbon elements that form a rubbing interface.

The rubbing interface minimizes or prevents leakage, however, if the heat generated by the rubbing interface is not adequately dissipated, the seal runner may thermally distort or coke the cooling oil. This may degrade performance or shorten useable life.

One approach to minimize overheating of the seal interface includes delivery of oil onto the seal runner from a stationary nozzle. The oil travels around the seal runner to extract thermal energy. The stationary nozzles provide an even film of oil on the seal land however, their applicability may be limited by physical constraints that prevent the nozzle from being located proximate the seal land

SUMMARY

A component for a gas turbine engine according to one disclosed non-limiting embodiment of the present disclosure includes a compartment housing that redirect an oil from at least one passage in a rotational component onto a backside of a seal land.

A further embodiment of the present disclosure includes, wherein the rotational component at least partially supports a carbon element.

A further embodiment of any of the foregoing embodiments of the present disclosure includes, wherein the rotational component is a seat for the carbon element.

A further embodiment of any of the foregoing embodiments of the present disclosure includes, wherein the rotational component is an aft seat for the carbon element.

A further embodiment of any of the foregoing embodiments of the present disclosure includes a flange that extends from the rotational component.

A further embodiment of any of the foregoing embodiments of the present disclosure includes, wherein the angled flange extends an axial distance greater than an axial distance of the seal land.

A further embodiment of any of the foregoing embodiments of the present disclosure includes, wherein the flange is angled away from the at least one passage.

A further embodiment of any of the foregoing embodiments of the present disclosure includes, wherein a surface of the compartment housing is angled away from the at least one passage.

A further embodiment of any of the foregoing embodiments of the present disclosure includes a swirl interrupter that extends from the surface of the compartment housing.

A further embodiment of any of the foregoing embodiments of the present disclosure includes, wherein the seal land is radial inboard of the swirl interrupter A further embodiment of any of the foregoing embodiments of the present disclosure includes, wherein the seal land is radial inboard of the compartment housing A compartment for a gas turbine engine according to another disclosed non-limiting embodiment of the present disclosure includes a compartment housing defined about an axis. A rotational component is defined at least partially around the axis, the rotational component defines at least one passage directed toward a flange. A seal land that extends from the compartment housing, the flange extends an axial distance greater than an axial distance of the seal land and a carbon element supported by the rotational component, the carbon element rides upon the seal land.

A further embodiment of any of the foregoing embodiments of the present disclosure includes, wherein the compartment housing redirect an oil onto a backside of a seal land A further embodiment of any of the foregoing embodiments of the present disclosure includes, wherein the compartment housing includes a surface angled away from the at least one passage.

A further embodiment of any of the foregoing embodiments of the present disclosure includes, wherein the seal land includes an end section that is angled relative to the axis.

A further embodiment of any of the foregoing embodiments of the present disclosure includes, wherein the end section define a hooked end.

A further embodiment of any of the foregoing embodiments of the present disclosure includes a swirl interrupter that extends from the compartment housing radial outboard of the seal land.

A method of backside cooling a seal land according to another disclosed non-limiting embodiment of the present disclosure includes directing oil from a rotational component toward an angled flange; directing oil from the angled flange radially outboard to a compartment housing; and directing the oil radially inboard from the compartment housing to a backside of a seal land.

A further embodiment of any of the foregoing embodiments of the present disclosure includes extending the seal land from the compartment housing.

A further embodiment of any of the foregoing embodiments of the present disclosure includes supporting a carbon element with the rotational component, the carbon element riding upon the seal land.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
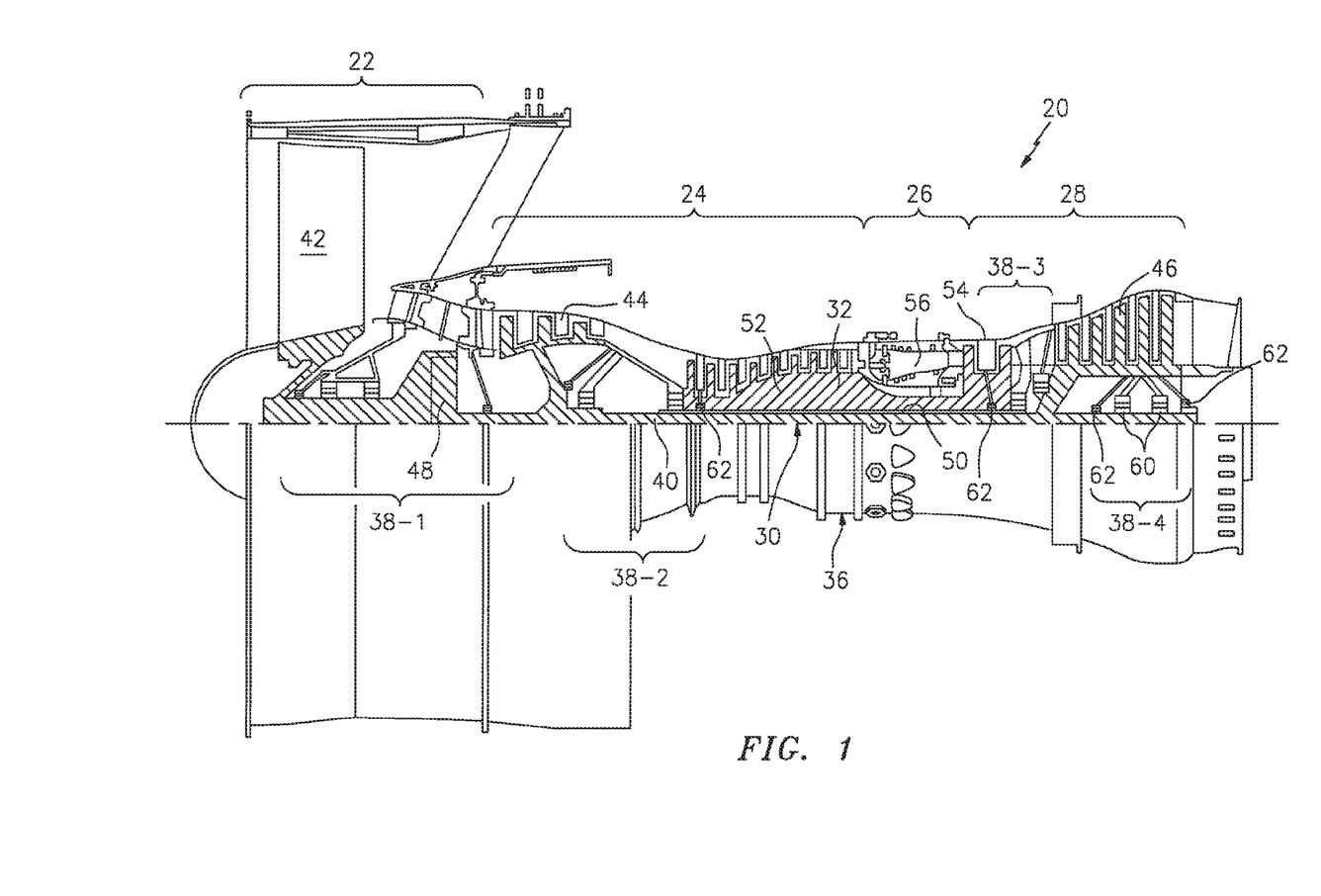
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one example gas turbine engine 20 is less than about 1150 fps (351 m/s).

Each of a multiple of bearing compartments 38-1, 38-2, 38-3, 38-4 include one or more bearings 60 (illustrated schematically) and one or more seal arrangements 62 (illustrated schematically). Various types of seal arrangements 62 may be used herewith and the seal arrangements 62 contemplated herein include, but are not limited to circumferential carbon seals. The bearings 60 and seal arrangements 62 respectively support and interface with the shafts 40, 50 of the respective low spool 30 and high spool 32.

The seal arrangements 62 operate to seal a "wet" zone from a "dry" zone. In other words, regions or volumes that contain oil may be referred to as a "wet" zone and an oil-free region may be referred to as a "dry" zone. So, for example, the interior of each bearing compartment 38-1, 38-2, 38-3, 38-4 may be referred to as a wet zone that ultimately communicates with an oil sump while the region external thereto may be referred to as a dry zone. That is, the bearings 60 support the low spool 30 and the high spool 32 and the seal arrangements 62 separate the "wet" zone from the "dry"

zone to define the boundaries of each bearing compartment 38-1, 38-2, 38-3, 38-4. Although particular bearing compartments and bearing arrangements are illustrated in the disclosed non-limiting embodiment, other bearing compartments and bearing arrangements in other engine architectures such as three-spool architectures will also benefit herefrom.

Figure 2:
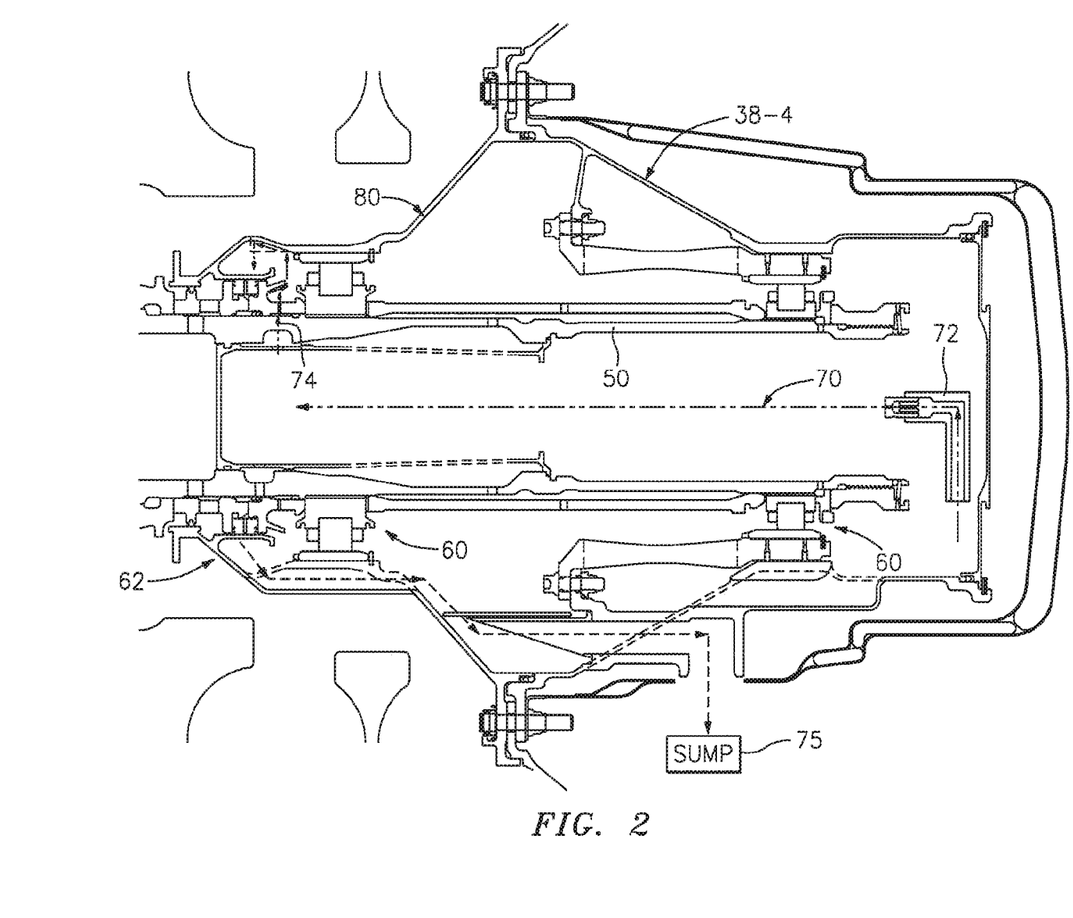
FIG. 2 is a longitudinal schematic sectional view of a bearing compartment that may be used with the gas turbine engine shown in FIG. 1.

With reference to FIG. 2, the bearing compartment 38-4, for example, contains a #5 bearing 60 and a #6 bearing 60 that rotationally support an aft end section of the low spool 30. A forward fluid-cooled seal arrangement 62 seals the forward section of the rear bearing compartment 38-4.

Figure 3:
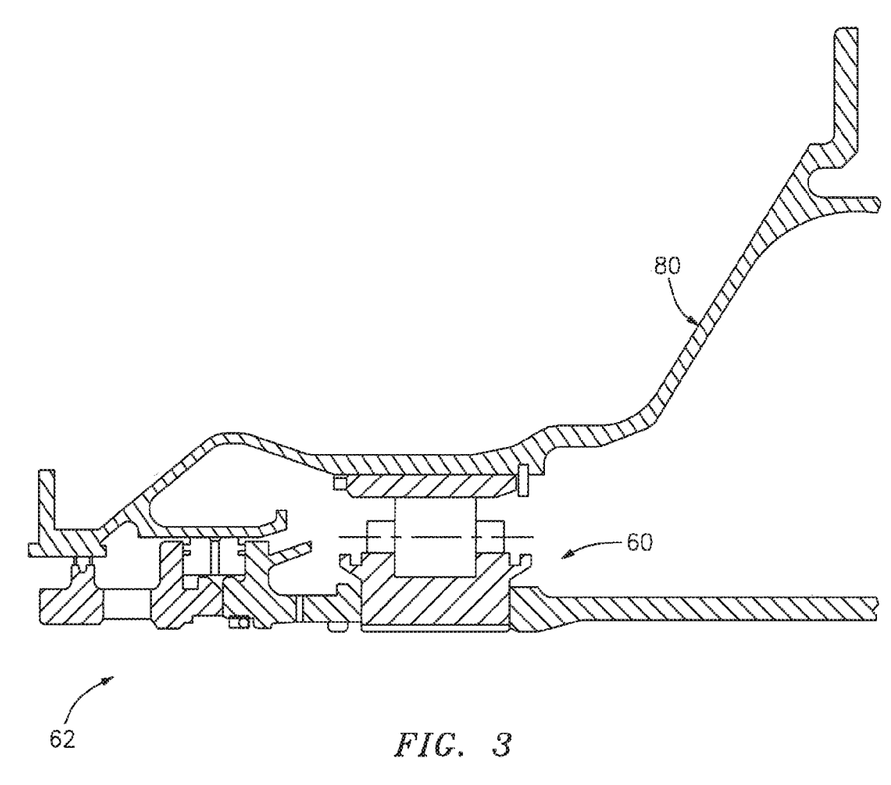
FIG. 3 is an expanded longitudinal schematic sectional view of a forward section of the bearing compartment of FIG. 2.

A lubrication system 70 (illustrated schematically) provides oil under pressure to lubricate and cool the moving parts of the engine 20, such as the bearings 60 and fluid-cooled seal arrangement 62. The lubrication system 70 discharges the oil from a nozzle 72 into the outer shaft 50. As the outer shaft 50 spins a mixture of air and oil is forced radially outward through one or more shaft apertures 74 into the rear bearing compartment 38-4 to lubricate the #5 bearing 60 and the forward fluid-cooled seal arrangement 62 (FIG. 3). The oil is then communicated to the oil sump 75.

Figure 4:
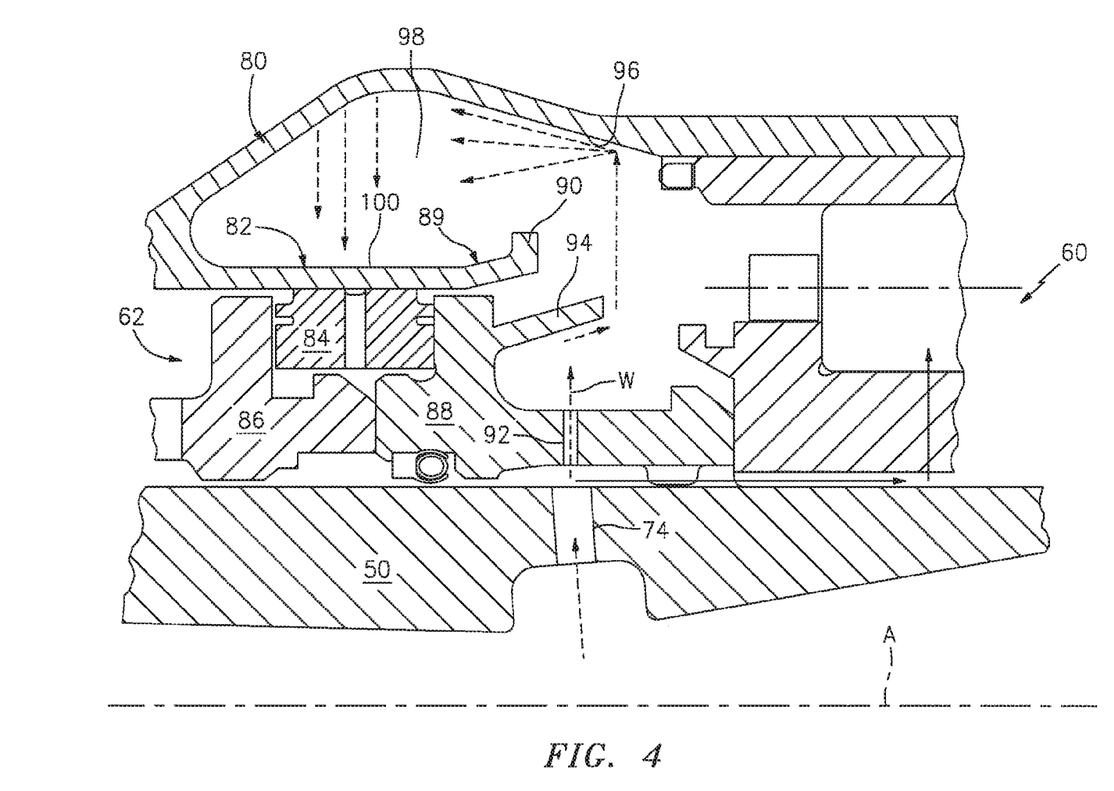
FIG. 4 is an expanded longitudinal schematic sectional view of a seal according to one disclosed non-limiting embodiment.

With reference to FIG. 4, the forward fluid-cooled seal arrangement 62 generally includes a compartment housing 80 with a seal land 82, a carbon element 84, a forward seat 86 and an aft seat 88. In this disclosed non-limiting embodiment, the compartment housing 80 is rotationally fixed and forms a portion of the engine static structure 36. That is, the compartment housing 80 forms a housing to at least partially define the wet zone of the rear bearing compartment 38-4 in the disclosed non-limited embodiment. The forward seat 86 and the aft seat 88 rotate with the outer shaft 50, the static carbon element 84 rubs against rotating aft seat 88 to provide a sealed interface.

The seal land 82 axially extends from the compartment housing 80 and includes an end section 89 which may include a hooked end 90. The end section 89 may define an angle with respect to the engine axis A.

The forward seat 86 and the aft seat 88 are mounted to the shaft 50 for rotation therewith and operate as a rotational component for the carbon element 84. The forward seat 86 and the aft seat 88 supports the carbon element 84. In the disclosed non-limiting embodiment, the aft seat 88 includes a multiple of oil passages 92 (one shown) in communication with the multiple of shaft apertures 74 to receive and direct the mixture of air and oil (illustrated schematically by arrows) radially outward into contact with a flange 94 of the aft seat 88. The flange 94 defines an angle with respect to the engine axis A which, in the disclosed non-limiting embodiment, is generally parallel to, and axially extends beyond, the end section. This axial geometry accommodates, for example, relative thermal expansion of the components.

In operation, the mixture of air and oil W is slung radially outward through the one or more shaft apertures 74 and through the multiple of oil passages 92. The oil W then contacts the flange 94 and is directed around the seal land 82 and into contact with a surface 96. The surface 96 may be angled or stepped from one or more swirl interrupters 98. Alternatively, the oil passages 92 may direct the oil mixture directly to the surface 96 of the compartment housing 80. Although a particular arrangement of (2) two swirl interrupters 98 at (30) thirty degree from top dead center (TDC) is illustrated in the disclosed non-limiting embodiment, it should be appreciated that any number, shape and spacing geometry may alternatively be provided.

Figure 5:
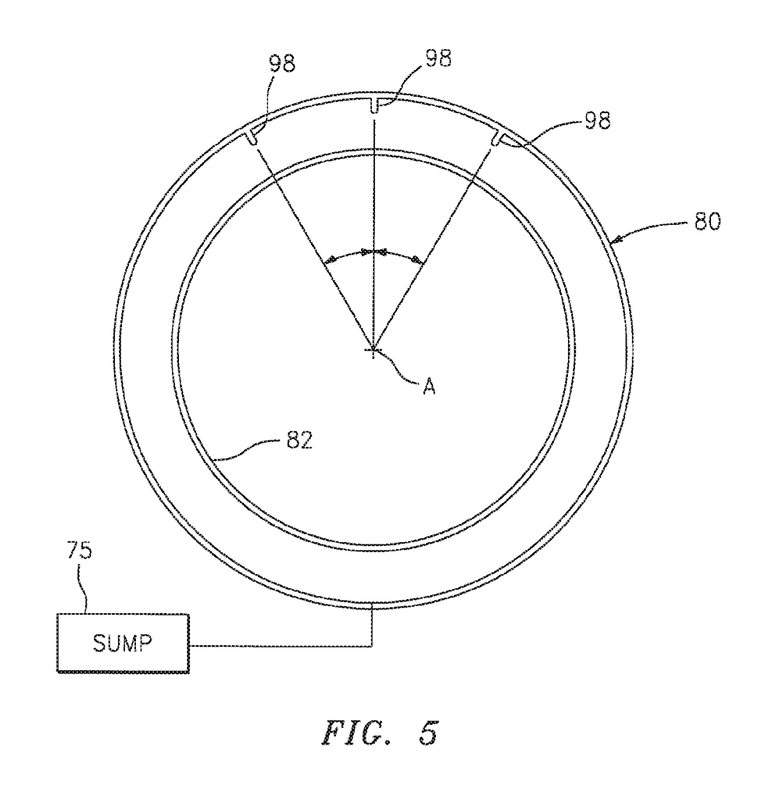
FIG. 5 is a lateral schematic sectional view of a compartment housing according to one disclosed non-limiting embodiment.

Gravity and the multiple of swirl interrupters 98 (also shown in FIG. 5) redirect the oil W onto a backside 100 of the seal land 82 to provide an even coat of cooling oil thereon. Although a particular arrangement of (3) three swirl interrupters 98 which are 0.2" (5 mm) tall located at top dead center (TDC) and (30) thirty degrees therefrom is illustrated in the disclosed non-limiting embodiment, it should be appreciated that any number, shape and spacing geometry may alternatively be provided. The heat from the carbon element 84 is thereby controlled by the backside oil which may be partially maintained thereon by the hooked end 90. The oil then traverses the annular seal land 82 until rejected into the oil sump 75 (illustrated schematically; FIG. 5).

Figure 6:
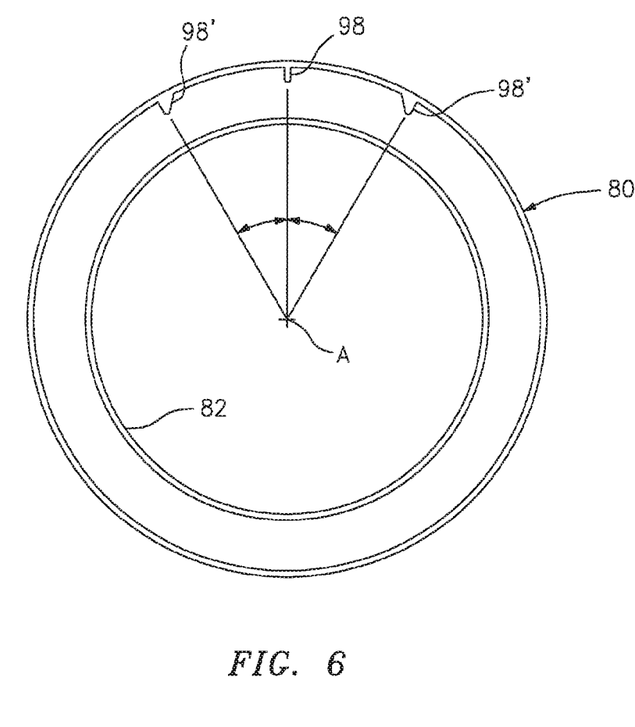
FIG. 6 is a lateral schematic sectional view of a compartment housing according to another disclosed non-limiting embodiment.

In another disclosed non-limiting embodiment one or more of the multiple of swirl interrupters 98' are ramp shaped (FIG. 6). It should be appreciated that other shapes and spacing geometry may alternatively be provided.

The annular seal land 82 harnesses the oil W after redirection from a outward slung radial direction to a radial inward direction. That is, the outward slung radially directed jet of oil W is redirected back inward to provide backside cooling without the heretofore necessity of jumper tubes. The compartment housing 80 is also relatively more radially compact which simplifies the design, reduces weight and reduces expense.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A compartment for a gas turbine engine having an engine axis, the component comprising:
   a rotationally fixed compartment housing defined about said engine axis;
   a rotational component defined at least partially around said axis, said rotational component defines at least one passage directed toward a flange angled at a flange angle with respect to the engine axis;
   a seal land that extends from said rotationally fixed compartment housing, said flange extends an axial distance greater than an axial distance of said seal land to direct a flow of oil from the passage axially past said seal land and into contact with a surface of said rotationally fixed compartment housing and thence onto a backside of said seal land; and a carbon element supported by said rotational component, said carbon element rides upon said seal land.

2. The compartment as recited in claim 1, wherein said rotationally fixed compartment housing includes a surface angled away from said at least one passage to receive said oil from said flange that extends said axial distance greater than said axial distance of said seal land.

3. The compartment as recited in claim 1, wherein said seal land includes an end section that is angled relative to said axis.

4. The compartment as recited in claim 1, wherein said seal land comprises an end section that defines a hooked end.

5. The compartment as recited in claim 1, further comprising a swirl interrupter that extends from said rotationally fixed compartment housing radial outboard of said seal land.

6. The compartment as recited in claim 1, wherein said surface is angled from one or more swirl interrupters.

7. The compartment as recited in claim 1, wherein said surface is stepped from one or more swirl interrupters.

8. The compartment as recited in claim 1, further comprising a swirl interrupter that extends from said rotationally fixed compartment housing at top dead center such that gravity redirects the oil therefrom onto the backside of the seal land.

9. The compartment as recited in claim 8, further comprising two additional swirl interrupters that extends from said rotationally fixed compartment housing, and wherein each of the additional swirl interrupters is located at thirty degrees from the swirl interrupter located a top dead center such that gravity redirects the oil therefrom onto the backside of the seal land.

10. The compartment as recited in claim 8, wherein said swirl interrupter is ramp shaped.

11. A method of backside cooling a seal land in a gas turbine engine having an engine axis, the method comprising:

providing a rotationally fixed compartment housing defined about said engine axis;

providing a rotational component defined at least partially around said axis, said rotational component defines at least one passage directed toward a flange angled at a flange angle with respect to the engine axis;

providing a seal land that extends from said rotationally fixed compartment housing, said flange extends an axial distance greater than an axial distance of said seal land;

providing a carbon element supported by said rotational component, said carbon element rides upon said seal land;

directing a flow of oil from the passage of the rotational component toward the angled flange;

directing the oil from the angled flange radially outboard and past the seal land to the compartment housing;

and directing the oil radially inboard from the compartment housing to a backside of the seal land.

* * * * *